(12) United States Patent
Willson et al.

(10) Patent No.: US 11,216,303 B1
(45) Date of Patent: Jan. 4, 2022

(54) INTEGRATED TASK REGISTRATION AND EXECUTION SYSTEM

(71) Applicant: Intuit Inc., Mountain View, CA (US)

(72) Inventors: Michael Willson, Sunnyvale, CA (US); Gennadiy Ziskind, San Mateo, CA (US)

(73) Assignee: Intuit Inc., Mountain View, CA (US)

( * ) Notice: Subject to any disclaimer, the term of this patent is extended or adjusted under 35 U.S.C. 154(b) by 241 days.

(21) Appl. No.: 16/524,577

(22) Filed: Jul. 29, 2019

(51) Int. Cl.
*G06F 9/48* (2006.01)

(52) U.S. Cl.
CPC .................... *G06F 9/4881* (2013.01)

(58) Field of Classification Search
CPC ... G06F 9/4881; G06F 9/5038; G06F 11/3664
See application file for complete search history.

(56) References Cited

U.S. PATENT DOCUMENTS

| | | | | |
|---|---|---|---|---|
| 10,146,524 | B1* | 12/2018 | Killmon | G06F 8/65 |
| 2015/0026121 | A1* | 1/2015 | Shani | G06F 16/24578 |
| | | | | 707/609 |
| 2015/0052501 | A1* | 2/2015 | Shani | G06F 11/3688 |
| | | | | 717/124 |
| 2016/0217050 | A1* | 7/2016 | Grimm | G06F 11/203 |
| 2017/0003948 | A1* | 1/2017 | Iyer | H04L 43/045 |
| 2017/0010889 | A1* | 1/2017 | Spektor | G06F 11/36 |
| 2017/0371636 | A1* | 12/2017 | Palavalli | G06F 9/5077 |
| 2018/0300221 | A1* | 10/2018 | Barbee | G06F 11/3006 |
| 2019/0363905 | A1* | 11/2019 | Yarvis | G06F 8/60 |

OTHER PUBLICATIONS

Docker; Understanding Docker; pp. 1-9; downloaded on Feb. 13, 2016 from http://docs.docker.com/engine/introduction/understanding-docker/#how-does-a-docker-image-work (Year: 2016).*
Willis; Docker and the Three Ways of DevOps; White Paper; 9 pages (Year: 2015).*
Smart (Jenkins: The Definitive Guide); Wakaleo Consulting; 417 pages (Year: 2011).*
Docker; Modern Application Architecture for the Enterprise—Delivering agility, portability and control with Docker Containers as a Service (CaaS); White Paper; 6 pages (Year: 2016).*
Harzog; Managing Applications in Docker Containers; White Paper; 9 pages (Year: 2014).*

* cited by examiner

*Primary Examiner* — Keith E Vicary
(74) *Attorney, Agent, or Firm* — Ferguson Braswell Fraser Kubasta PC

(57) ABSTRACT

A method may include obtaining, for a task of a pipeline of an application: task execution metadata including a set of previous results, and a task image including executable code and an execution environment. The method may further include executing the executable code in the execution environment to generate a set of new results, and controlling execution of the pipeline using the set of new results and the set of previous results.

20 Claims, 10 Drawing Sheets

INTEGRATED TASK REGISTRATION AND EXECUTION SYSTEM

BACKGROUND

Conventional task execution (e.g., pipeline) systems typically include multiple components that require manual setup and integration. Conventional task execution systems also lack a consistent framework and interface for integrating various aspects of task management and control, including task registration, customization, validation, prioritization, execution, and results processing.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including obtaining, for a task of a pipeline of an application: task execution metadata including a set of previous results, and a task image including executable code and an execution environment. The method further includes executing the executable code in the execution environment to generate a set of new results, and controlling execution of the pipeline using the set of new results and the set of previous results.

In general, in one aspect, one or more embodiments relate to a system including a pipeline registry configured to store a pipeline of an application. The pipeline includes tasks including a task. The system further includes a task image registry configured to store, for the task, a task image including executable code and an execution environment, an execution metadata repository configured to store, for the task of the pipeline, task execution metadata including a set of previous results, and a pipeline execution service configured to execute the executable code in the execution environment to generate a set of new results, and control execution of the pipeline using the set of new results and the set of previous results.

In general, in one aspect, one or more embodiments relate to a non-transitory computer readable medium including instructions that, when executed by a computer processor, perform: obtaining, for a task of a pipeline of an application: task execution metadata including a set of previous results, and a task image including executable code and an execution environment. The method further includes executing the executable code in the execution environment to generate a set of new results, and controlling execution of the pipeline using the set of new results and the set of previous results.

Other aspects of the invention will be apparent from the following description and the appended claims.

DETAILED DESCRIPTION

Figure 1A:
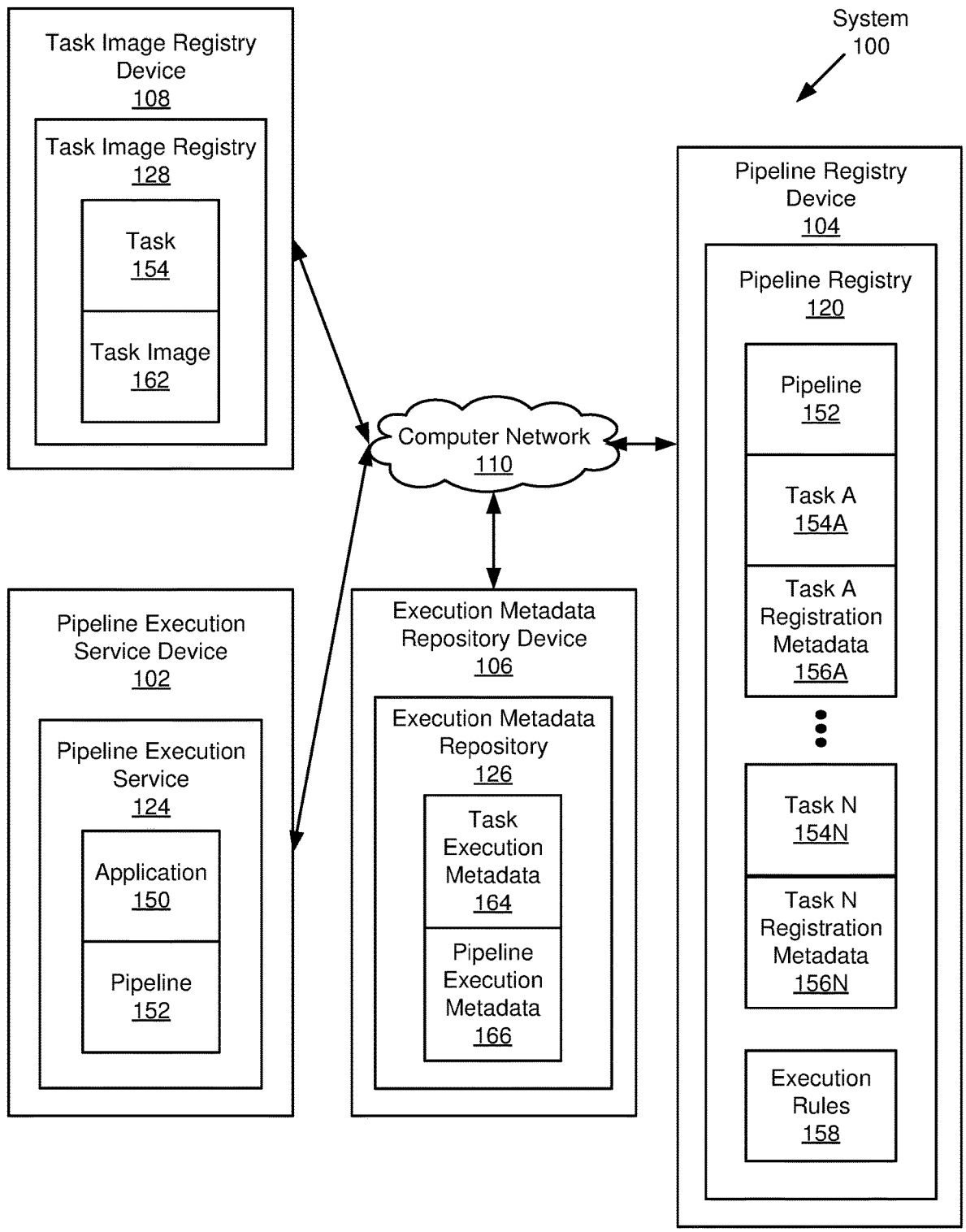
FIG. 1A, FIG. 1B, and FIG. 1C show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to registration and execution of one or more tasks. In one or more embodiments, a task image encapsulates executable code and an execution environment that includes software components needed for execution. Encapsulation enables the task image to be executed in multiple continuous integration/continuous deployment (CI/CD) pipelines (hereinafter referred to as CI/CD pipelines or simply pipelines) without requiring modification of the task image or installation of additional software components. Thus, task developers may seamlessly deploy their tasks in multiple pipelines. In one or more embodiments, a task satisfies a contract that specifies requirements to be satisfied by task inputs and outputs.

Task inputs may include task registration metadata that describes attributes of the task (e.g., task owner, whether blocking is requested, etc.). Task outputs may include task execution metadata that describes results of executing the task (e.g., task duration, successful vs. unsuccessful execution, etc.). Compliance with the contract enables a consistent interface for the management and control of task execution across multiple pipelines. In one or more embodiments, pipeline execution is controlled using task execution metadata corresponding to the tasks in the pipeline. For example, a decision to continue vs. block (i.e., halt) execution of the pipeline in response to the failed execution of a task may be based on the task execution metadata corresponding to the task. The combination of encapsulated task images and consistent interfaces enables an infrastructure that supports the smooth execution of pipelines with large numbers of tasks. For example, the pipelines may be testing pipelines for software systems with large numbers of components.

FIG. 1A shows a system (100) in accordance with one or more embodiments of the invention. As shown in FIG. 1A, the system (100) includes a pipeline execution service device (102), a pipeline registry device (104), an execution metadata repository device (106), a task image registry device (108), and a computer network (110). The various devices and systems shown in FIG. 1A may correspond to the computing system (500) described with respect to FIG. 5A and the accompanying description below, or take the form of the client device (526) described with respect to FIG. 5B. In one or more embodiments, pipeline execution service device (102), the pipeline registry device (104), execution metadata repository device (106), and task image registry device (108) may communicate via the computer network (110) (e.g., the network (520) described with respect to FIG. 5B).

In one or more embodiments of the invention, the pipeline execution service device (102), pipeline registry device (104), execution metadata repository device (106), and/or task image registry device (108) include any type of storage unit and/or device (e.g., a file system, database, collection of tables, or any other storage mechanism) for storing data. Further, the pipeline execution service device (102), pipeline registry device (104), execution metadata repository device (106), and/or task image registry device (108) may include multiple different storage units and/or devices. The multiple different storage units and/or devices may or may not be of the same type or located at the same physical site.

In one or more embodiments, the pipeline execution service device (102) includes a pipeline execution service (124). The pipeline execution service (124) may include functionality to centralize, in a consistent manner, the execution of tasks (154A, 154N) in a pipeline (152) for an application (150). For example, the pipeline execution service (124) may be a continuous integration and/or continuous delivery service, such as Jenkins. The application (150) may be any software application used by multiple users (e.g., over a network). For example, the application (150) may be an inventory, production, or logistics management application, a personal financial management application, such as Mint®, or a business management applications, such as Intuit® QuickBooks Online® (Mint, Intuit, and QuickBooks Online are trademarks of Intuit, Inc., Mountain View, Calif.). In one or more embodiments, a pipeline (152) is a continuous integration and/or continuous delivery pipeline. For example, a pipeline (152) may be a development pipeline, a production pipeline, a deployment pipeline, etc.

In one or more embodiments, the pipeline registry device (104) includes a pipeline registry (120). The pipeline registry (120) may include one or more tasks (154A, 154N), task registration metadata (156A, 156N), and execution rules (158) for each pipeline (152). Each task (154A) may be a unit of work. The task (154A) may be submitted to the pipeline registry (120) by a task developer. For example, a task (154A) may be executable code, such as a suite of tests, where each test is software or application specific hardware configured to test an application (150). In one or more embodiments, the pipeline registry (120) includes functionality to register a task (154A) with one or more pipelines. Each task (154A) may be associated with task registration metadata (156A) that describes attributes of the corresponding task (154A). In one or more embodiments, the pipeline registry device (104) includes functionality to obtain task registration metadata (156A) from a task image (162) corresponding to a task (154A).

Figure 1B:
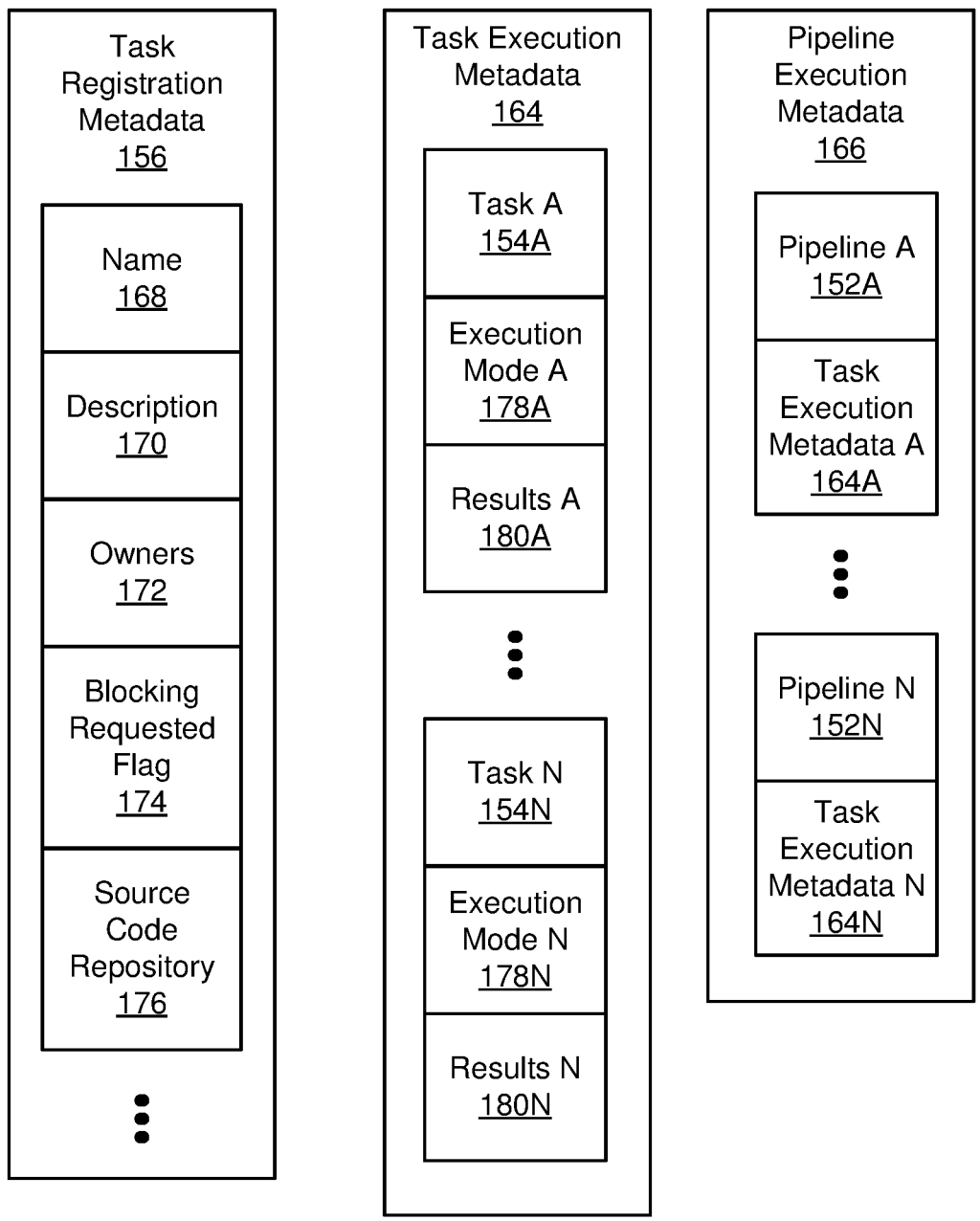

Turning to FIG. 1B, in one or more embodiments, task registration metadata (156) includes a name (168), a description (170), one or more owners (172), a blocking requested flag (174), a source code repository (176), and/or additional attributes associated with a task. The name (168) may be an identifier associated with the task corresponding to the task registration metadata (156). The description (170) may be a detailed description of the corresponding task. The owners (172) may be one or more points of contact responsible for the corresponding task. For example, the owners (172) may be represented as an email address for one or more individuals or groups. The blocking requested flag (174) may indicate whether an execution mode of "blocking" has been requested for the corresponding task. In one or more embodiments, unsuccessful execution of a task whose execution mode is "blocking" will halt the pipeline in which the task was executing. The source code repository (176) may specify a location where source code for the task is stored. For example, the location may be a file in persistent storage (e.g., persistent storage (506) of a computing system (500)).

In one or more embodiments, additional attributes associated with the task include: registry, context, application uniform resource locator (URL), application version, run number, build URL, image path and/or image version. The registry may be an identifier of the registry (e.g., task image registry (128)) that stores the task image (162) corresponding to the task. The context may be a pipeline in which the task is being run. For example, different portions of the executable code (190) (e.g., corresponding to different tests in a test suite) of the task image (162) may be run depending on the pipeline running the task. The application URL may be the URL to the application (150) to which the task is applied. The application version may be the version number of the application (150) to which the task is applied. The run number may identify the specific run of the pipeline that is running (or ran) the task. The build URL may be the URL (e.g., a Jenkins build URL) to the build job running the task. The image path may be the path (e.g., a full Docker image path) of the task image (162) corresponding to the task. The image version may be the version number of the task image (162) corresponding to the task. In addition, the task registration metadata (156) may include other attributes, such as: resources required, resource constraints (e.g., a memory usage constraint), preconditions (e.g., conditions required to be satisfied before executing the task), execution deadline, input constraints, output constraints, etc.

Returning to FIG. 1A, the tasks (154A, 154N) of a pipeline (152) may be executed according to the execution rules (158) for the corresponding pipeline (152). In one or more embodiments, the execution rules (158) are global rules that apply to all pipelines. Alternatively, each pipeline (152) may specify its own pipeline-specific execution rules (158). The execution rules (158) may specify validation requirements for tasks (154A, 154N) to satisfy prior to execution. In addition, the execution rules (158) may assign priorities to the tasks (154A, 154N), may specify how to sequence the execution of the tasks (154A, 154N), may specify how to determine the execution mode, stability and/or execution success/failure criteria, etc. of the tasks (154A, 154N). The execution rules (158) may be based on dependencies among the tasks (154A, 154N). For example, dependencies may be used to prioritize and/or sequence the tasks (154A, 154N). Continuing this example, the dependencies may indicate sequential constraints among the tasks (154A, 154N) that require a task to be executed before or after executing another task. As another example, the priority of one task may depend on whether another task has been successfully executed. In addition, the priority of a task may be based on the results of executing the task, as described below.

In one or more embodiments, the execution metadata repository device (106) includes an execution metadata repository (126). The execution metadata repository (126) may store task execution metadata (164) and pipeline execution metadata (166). Returning to FIG. 1B, the task execution metadata (164) may include, for each task (154A, 154N): an execution mode (178A, 178N), and results (180A, 180N). In one or more embodiments, the execution mode (178A) indicates whether unsuccessful execution of the corresponding task (154A) halts execution of the pipeline that includes the task (154A). In one or more embodiments, the execution mode (178A) is a flag that is set to "blocking" or "non-blocking". The execution mode (178A) may be assigned based on the stability of the corresponding task. In other words, unsuccessful execution of a stable task may be indicative of a serious problem, and thus the pipeline that includes the unsuccessfully executed stable task may be halted. In contrast, unsuccessful execution of an unstable task may not indicate a serious problem, and thus the pipeline that includes the unsuccessfully executed unstable task may continue execution. For example, the execution rules (158) may specify that a task that has been executed successfully 10 times in a row (e.g., according to the results (180A) corresponding to the task) is stable, and a task that has been executed unsuccessfully 3 times in a row is unstable. The results (180A) for a task (154A) may include task outputs, errors, activity logs, status codes (e.g., pass/fail codes, error codes, timeouts, etc.), execution duration, error logs, resources used, whether unsuccessful execution of the task blocked the pipeline containing the task, etc. In one or more embodiments, the results (180A) for the task (154A) include previous results due to executing the task (154A) at different points in time and/or executing the task (154A) in different pipelines (152). For example, the previous results may include task outputs, errors, activity logs, status codes, execution duration, resources used, whether unsuccessful execution of the task blocked the pipeline containing the task, etc. due to executing the task (154A) in various time intervals. In one or more embodiments, the task execution metadata (164) is used by the pipeline execution service (124) to determine whether the corresponding task is sufficiently stable for execution.

In one or more embodiments, as described above, the priority of a task (154A) may be based on the results (180A) corresponding to the task. For example, the priority may be based on an average duration of the task, or the stability of the task. Continuing this example, the stability may be measured based on the number of successful executions of the task and the number of failed executions of the task.

In one or more embodiments, the pipeline execution metadata (166) may include task execution metadata (164A, 164N) for each pipeline (152A, 152N). In other words, the pipeline execution metadata (166) may include task execution metadata (164A) corresponding to each task (154A, 154N) of a pipeline (152A).

Returning to FIG. 1A, in one or more embodiments, the pipeline execution service (124) is implemented in hardware (e.g., circuitry), software, firmware, and/or any combination thereof. The pipeline execution service (124) may include functionality to validate that a task (154A) in a pipeline (152) complies with a contract before executing the task (154A). For example, requiring compliance with the contract provides a consistent interface for task execution. The pipeline execution service (124) may use the execution rules (158) (e.g., obtained from the pipeline registry (120)) for the pipeline (152) to validate that the task (154A) complies with the contract. In one or more embodiments, the contract specifies requirements to be satisfied by the task registration metadata (156A) corresponding to the task (154A) prior to executing the task (154A). For example, the contract may specify that the task registration metadata (156A) specify an owner (172) and/or a source code repository (176). Further, the contract may specify output requirements to be satisfied prior to storing the results (180A) of executing the task (154A) in the execution metadata repository (126). For example, the contract may specify that the results (180A) be stored in a specific format.

In one or more embodiments, the pipeline execution service (124) includes functionality to obtain task execution metadata (164) (e.g., from the execution metadata repository (126)) for a task. The pipeline execution service (124) may include functionality to obtain execution results (e.g., via the API (194)) from the task image (162). The pipeline execution service (124) may include functionality to control execution of a pipeline using task execution metadata (164).

In one or more embodiments, the task image registry device (108) includes a task image registry (128). The task image registry (128) may store a task image (162) for each task (154). The task (154) may be executed by executing the corresponding task image (162). For example, the task image (162) may be a Docker image that may be run in a Docker-enabled environment.

Figure 1C:
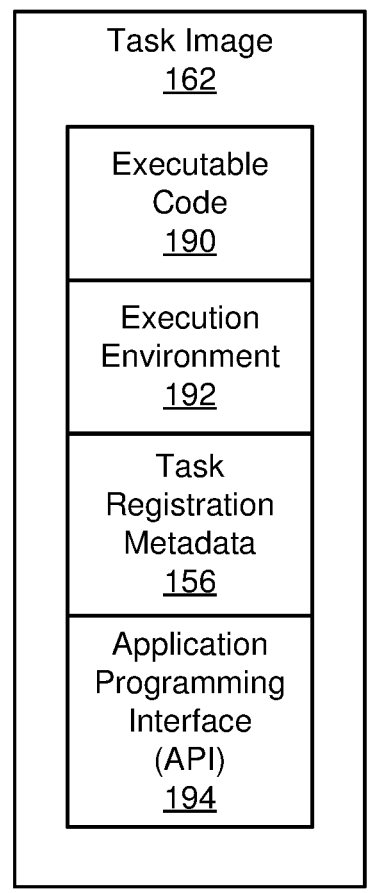

Turning to FIG. 1C, in one or more embodiments, the task image (162) includes executable code (190), an execution environment (192), task registration metadata (156), and an application programming interface (API) (194). In one or more embodiments, the executable code (190) may be a collection of object code (e.g., generated by a compiler). For example, the executable code (190) may be dynamically linked code or an archive file that packages compiled components. In one or more embodiments, the execution environment (192) includes software components needed to execute the executable code (190). For example, the execution environment (192) may include libraries, frameworks, and any other technologies upon which the executable code (190) depends (e.g., no additional installation, customization or resources are required to execute the executable code (190)).

In one or more embodiments, the task image (162) is a customized image that includes customized executable code (190) and/or a customized execution environment (192). For example, the executable code (190) may be customized to execute a portion of the executable code (190) (e.g., one or more tests of a test suite). Similarly, the execution environment (192) may be customized to include specific software components. The customization may integrate knowledge learned during the lifecycle of the task corresponding to the task image (162) (e.g., as task execution metadata (164) for the task is accumulated and analyzed).

In one or more embodiments, the API (194) includes a set of methods of communication between the task image (162) and the pipeline execution service (124). For example, the pipeline execution service (124) may provide input arguments to the task image (162) via the API (194). Similarly, the task image (162) may provide (e.g., to the pipeline execution service (124) via the API (194)) results (180A) generated by executing the task image (162). The API (194) may be accessible to software components via the computer network (110).

While FIG. 1A, FIG. 1B, and FIG. 1C show configurations of components, other configurations may be used without departing from the scope of the invention. For example, various components may be combined to create a single component. As another example, the functionality performed by a single component may be performed by two or more components.

Figure 2:
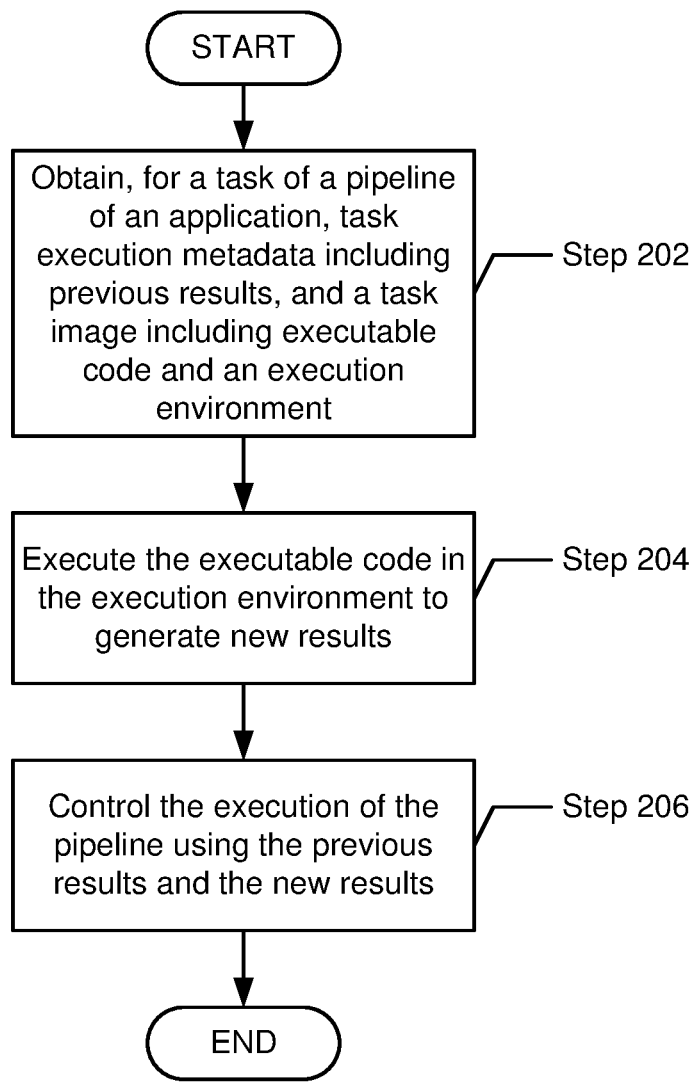
FIG. 2 and FIG. 3 show flowcharts in accordance with one or more embodiments of the invention.

FIG. 2 shows a flowchart in accordance with one or more embodiments of the invention. The flowchart depicts a process for task execution. One or more of the steps in FIG. 2 may be performed by the components (e.g., the pipeline execution service (124) and the task image (162)) of the system (100)) discussed above in reference to FIG. 1A, FIG. 1B, and FIG. 1C. In one or more embodiments, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, task execution metadata and a task image are obtained for a task T of a pipeline of an application. The pipeline execution service may obtain task T's execution metadata by submitting a query to the execution metadata repository (e.g., the query may include identifiers corresponding to task T and the pipeline). In one or more embodiments, the task execution metadata includes previous results due to executing task T at different points in time and/or executing task T in different pipelines. The pipeline execution service may obtain the task image by submitting a query to the task image registry (e.g., the query may include an identifier corresponding to task T).

In Step 204, new results are generated by executing the executable code in the execution environment. The new results may be generated by the task image. In one or more embodiments, the pipeline execution service obtains the new results (e.g., via the API) from the task image. The pipeline execution service may write the new results to the execution metadata repository.

In Step 206, execution of the pipeline is controlled using the new results and the previous results. For example, the pipeline execution service may assign or modify the execution mode corresponding to task T. In one or more embodiments, the pipeline execution service writes the assigned or modified execution mode to the execution metadata repository. The pipeline execution service may modify the execution mode corresponding to task T based on applying execution rules to the new results and the previous results. For example, the execution rules may assign the execution mode "blocking" to task T if task T has been executed successfully 10 times in a row. Continuing this example, if the previous results indicate that task T has been executed successfully 9 times in a row, and the new results indicate that task T has been executed successfully, then the pipeline execution service may modify the execution mode for task T from "non-blocking" to "blocking". In one or more embodiments, the execution rules require that the task registration metadata include a blocking requested flag set to "true" before assigning the execution mode to "blocking". The task registration metadata may be obtained from the task image for task T, which in turn may be obtained from the task image registry. Alternatively, the task registration metadata for task T may be obtained from the pipeline registry.

As another example, the pipeline execution service may control the execution of the pipeline by assigning or modifying a priority corresponding to another task U. Continuing this example, the priority of task U may depend on whether the new results indicate that task T has been successfully executed. Alternatively, the priority of task U may depend on the execution mode of task T.

Figure 3:
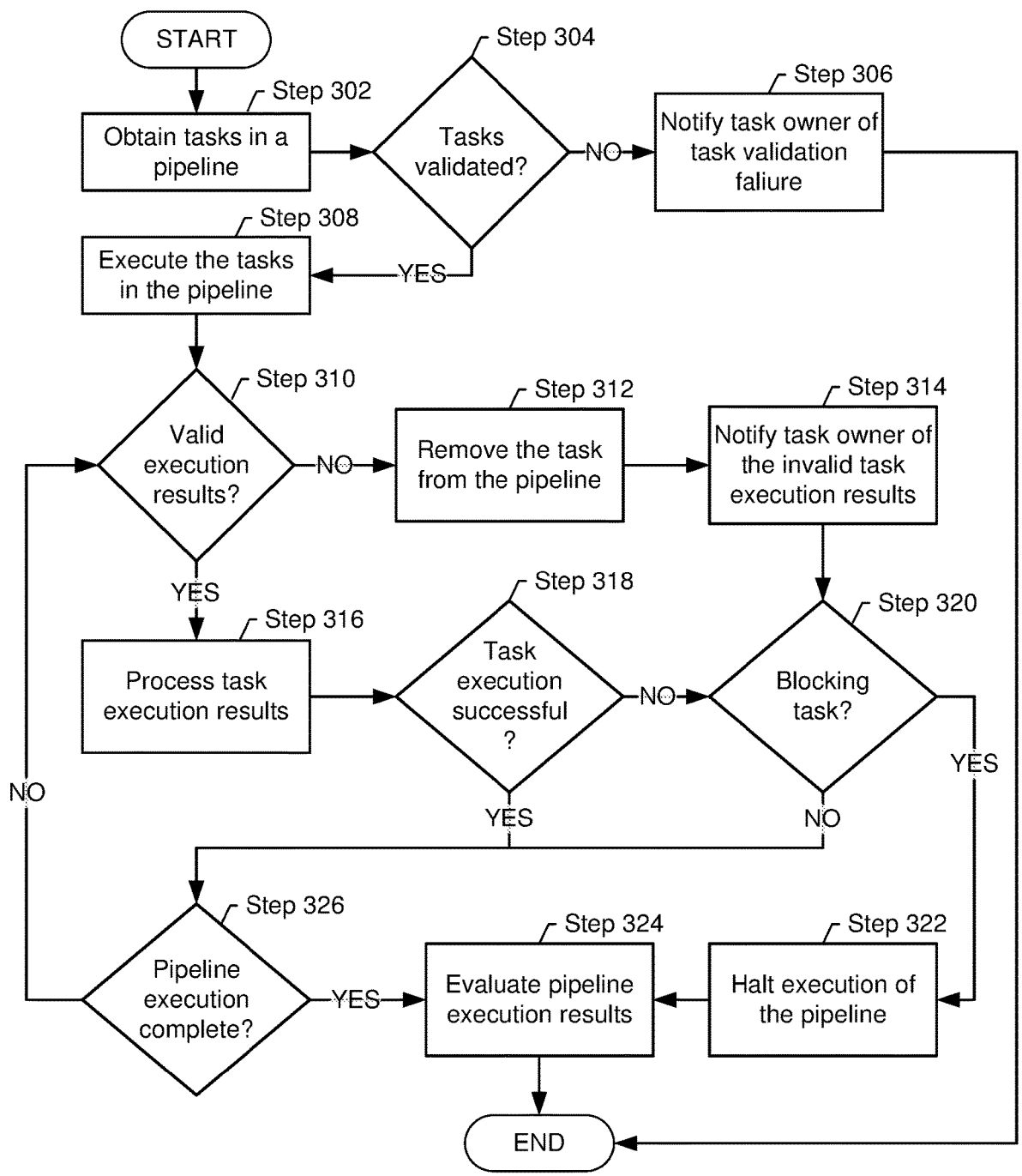

FIG. 3 shows a flowchart in accordance with one or more embodiments of the invention. The flowchart depicts a process for process for task execution. One or more of the steps in FIG. 3 may be performed by the components (e.g., the pipeline execution service (124)) of the system (100)) discussed above in reference to FIG. 1A and FIG. 1B. In one or more embodiments, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 302, tasks in a pipeline are obtained. In one or more embodiments, the pipeline execution service obtains a collection of tasks registered with the pipeline by querying the pipeline registry with the pipeline (e.g., with an identifier corresponding to the pipeline). The pipeline execution service may also obtain execution rules for the pipeline by querying the pipeline registry.

If, in Step 304, the tasks obtained in Step 302 above are validated for execution, then Step 308 below is executed. In one or more embodiments, the pipeline execution service determines that the tasks are valid for execution when the task registration metadata and/or the task execution metadata corresponding to the tasks comply with the requirements specified in a contract. For example, the contract may require that task registration metadata include an owner, a description, and a source code repository for the corresponding task. In addition, the contract may require that each task be stable according to stability criteria specified in execution rules for the pipeline.

Otherwise, if Step 304 determines that the tasks are not validated for execution, then in Step 306 the owner of each invalid task is notified of the validation failure. The pipeline execution service may determine the owner using the task registration metadata.

In Step 308, the tasks in the pipeline are executed (see description of Step 204 above).

If, in Step 310, it is determined that results generated by executing a task are valid, then Step 316 below is executed. The pipeline execution service may determine whether the results generated by executing the task are valid as the results become available (e.g., as each task in the pipeline is completed). In one or more embodiments, the pipeline execution service determines that the results are valid when the results satisfy output requirements of a contract. For example, the output requirements may specify that the results be stored in a specific format. Otherwise, if Step 310 determines that the results generated by executing the task are invalid, then Step 312 below is executed.

In Step 312, the task is removed from the pipeline (e.g., due to the failure to validate the results generated by executing the task). In one or more embodiments, the pipeline execution service may replace, in the pipeline, the task with a previous version of the task whose corresponding results have been validated, and then re-execute Step 310 above as the results of tasks in the pipeline become available.

In Step 314, the owner of the task is notified of the invalid task execution results, and then Step 320 below is executed.

In Step 316, the results of executing the task are processed (see description of Step 206 above).

If, in Step 318, it is determined that the task was executed successfully in Step 308 above, then Step 326 below is executed. Otherwise, if Step 318 determines that the task was not executed successfully, then Step 320 below is executed.

If, in Step 320, it is determined that the execution mode of the task is "blocking", then in Step 322 execution of the pipeline is halted, and then Step 324 below is executed. Otherwise, if Step 320 determines that the execution mode of the task is "non-blocking", then Step 326 below is executed.

In Step 324, the results of executing the tasks of the pipeline are evaluated.

For example, the results may include information on task durations, errors encountered, which tasks were executed successfully vs. unsuccessfully, whether a failed task blocked the pipeline, etc. Then, the process ends.

If, in Step 326, it is determined that execution of the pipeline is complete, then Step 324 above is executed to evaluate the pipeline execution results. Otherwise, if Step 326 determines that the execution of the pipeline is incomplete, then execution of the pipeline continues, and Step 310 above is again executed as the results of executing unfinished tasks in the pipeline become available.

Figure 4A:
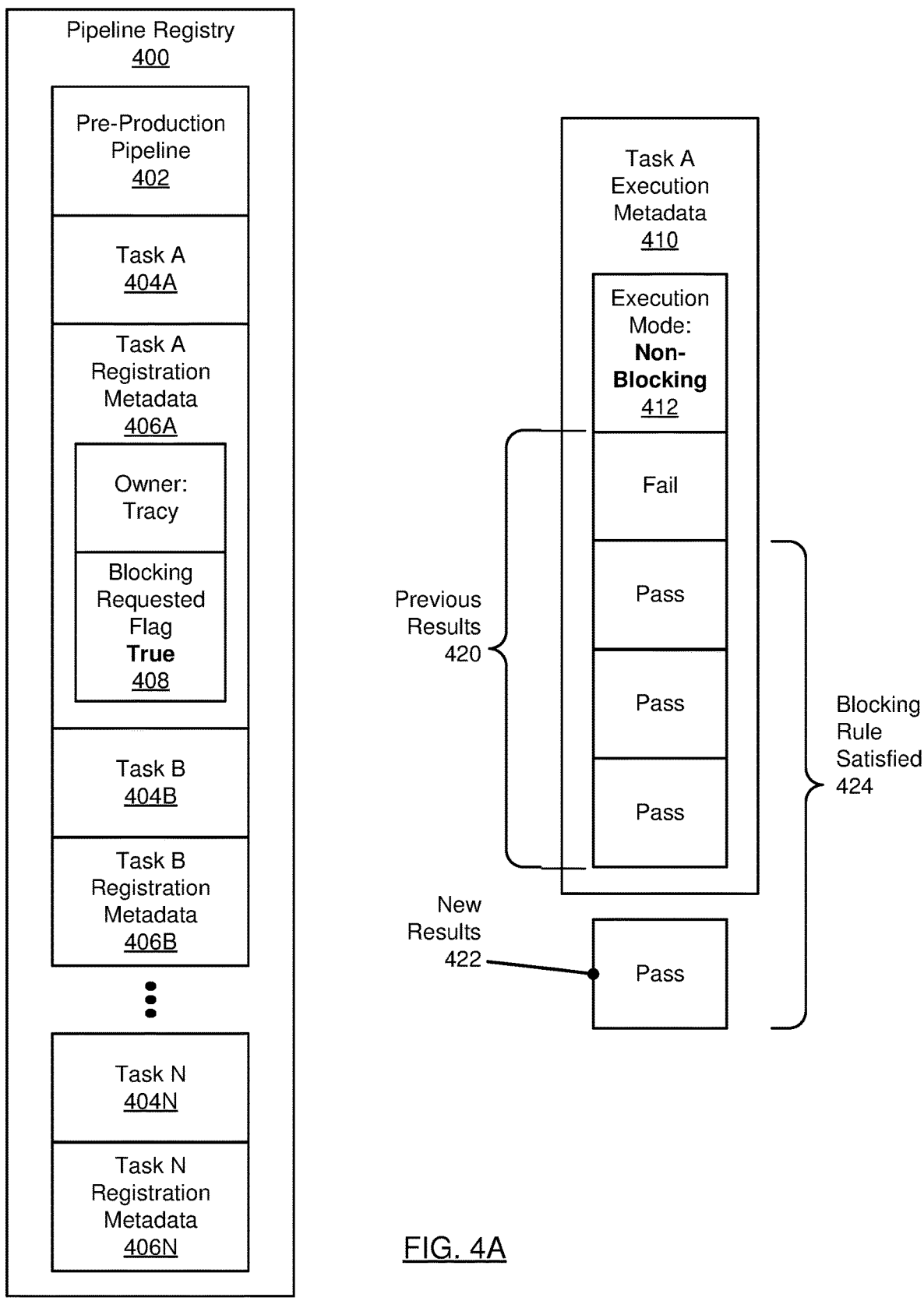
FIG. 4A, FIG. 4B, FIG. 4C, and FIG. 4D show examples in accordance with one or more embodiments of the invention.

The following example is for explanatory purposes only and not intended to limit the scope of the invention. FIG. 4A, FIG. 4B, FIG. 4C, and FIG. 4D show an implementation example in accordance with one or more embodiments of the invention. In FIG. 4A, the pipeline registry (400) ((120) in FIG. 1A) indicates that a pre-production pipeline (402) ((152) in FIG. 1A) includes tasks (404A, 404B, 404N) ((154A, 154N) in FIG. 1A and FIG. 1B) with associated task registration metadata (406A, 406B, 406N) ((156A, 156N) in FIG. 1A and (156) in FIG. 1B). The tasks (404A, 404B, 404N) execute test suites used during the pre-production testing of a financial management application. Each test in each test suite is software that tests one or more features of the financial management application.

Initially, the pipeline execution service ((124) in FIG. 1A and FIG. 1B) determines that the tasks (404A, 404B, 404N) are valid for execution by applying execution rules ((158) in FIG. 1A) to the task registration metadata (406A, 406B, 406N) and task execution metadata obtained from the execution metadata repository ((126) in FIG. 1A and FIG. 1B). FIG. 4A illustrates task A execution metadata (410) ((164) in FIG. 1A and FIG. 1B) for task A (404A). Task A execution metadata (410) includes previous results (420) indicating that after an initial failure, task A (404A) has passed 3 times in a row. The previous results (420) satisfy the execution rules for the pipeline (402), which, in this example, prevent the execution of any task whose execution resulted in failure the last 3 times the task was run.

FIG. 4A also shows that the task A registration metadata (406A) includes a blocking requested flag (408) set to "true", indicating that blocking has been requested for task A (404A). FIG. 4A also shows that the task A execution metadata (410) includes an execution mode of "non-blocking" (412). In this example, the execution rules include a blocking rule that requires the results to indicate "pass" 4 times in a row before assigning an execution mode of "blocking".

Figure 4B:
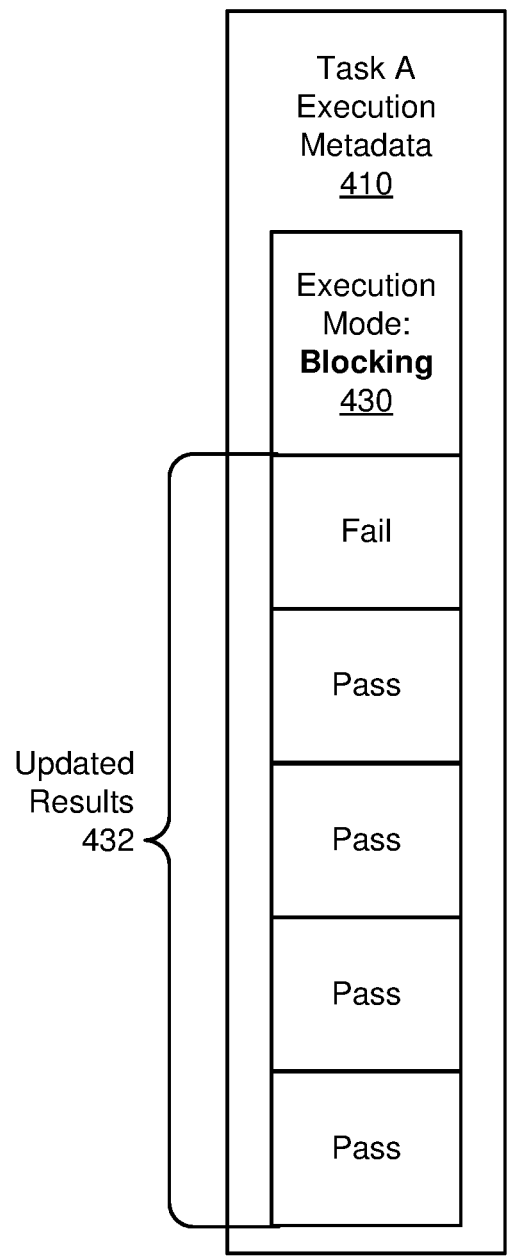

The pipeline execution service obtains new results (422) by executing task A (404A) indicating that task A passed. The combination of the previous results (420) and the new results (422) satisfies the blocking rule (424). FIG. 4B shows that the previous results and the new results have been combined into updated results (432). FIG. 4B also shows the modified execution mode of "blocking" (430), due to the satisfaction of the blocking rule.

Figure 4C:
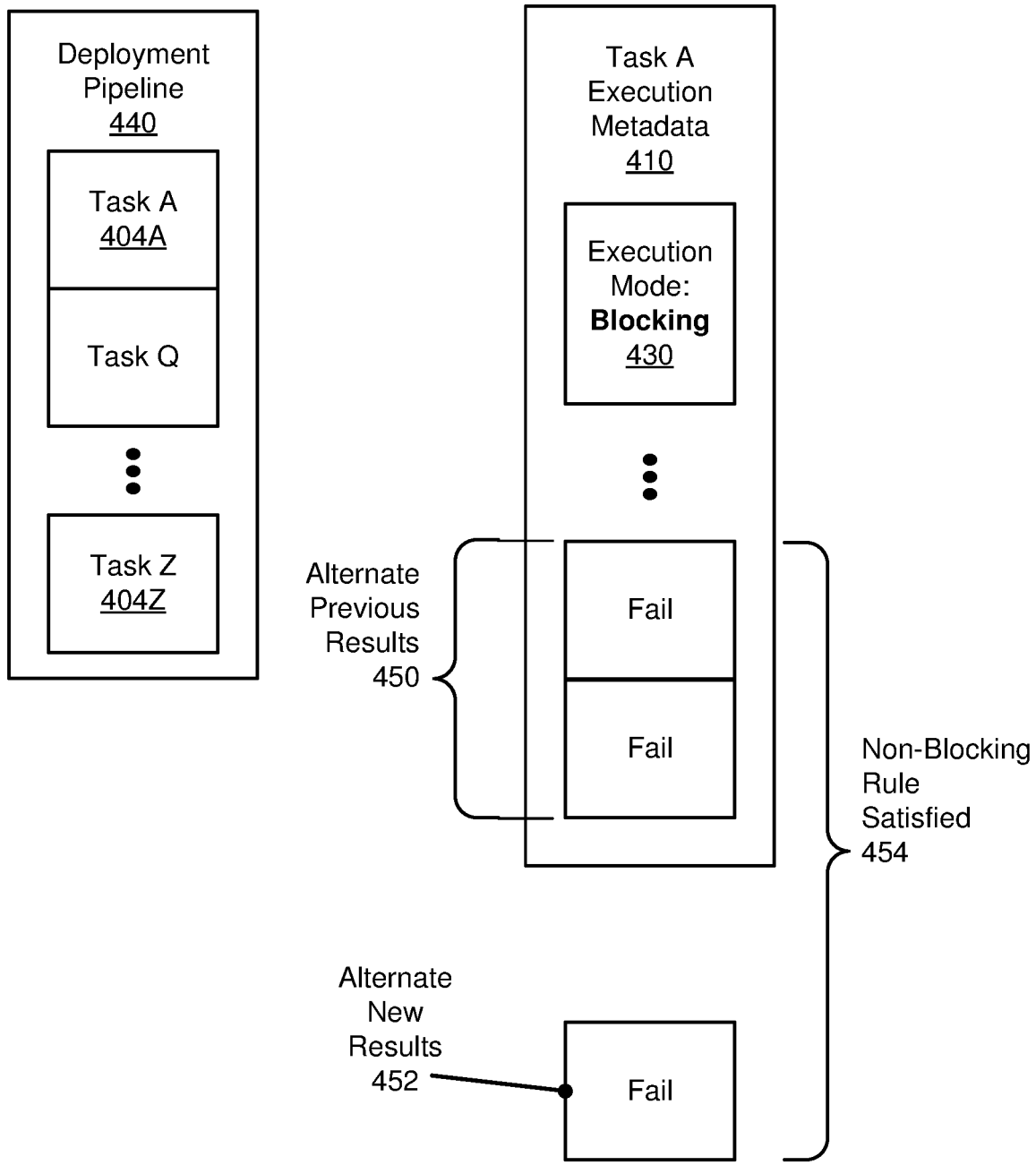
Figure 4D:
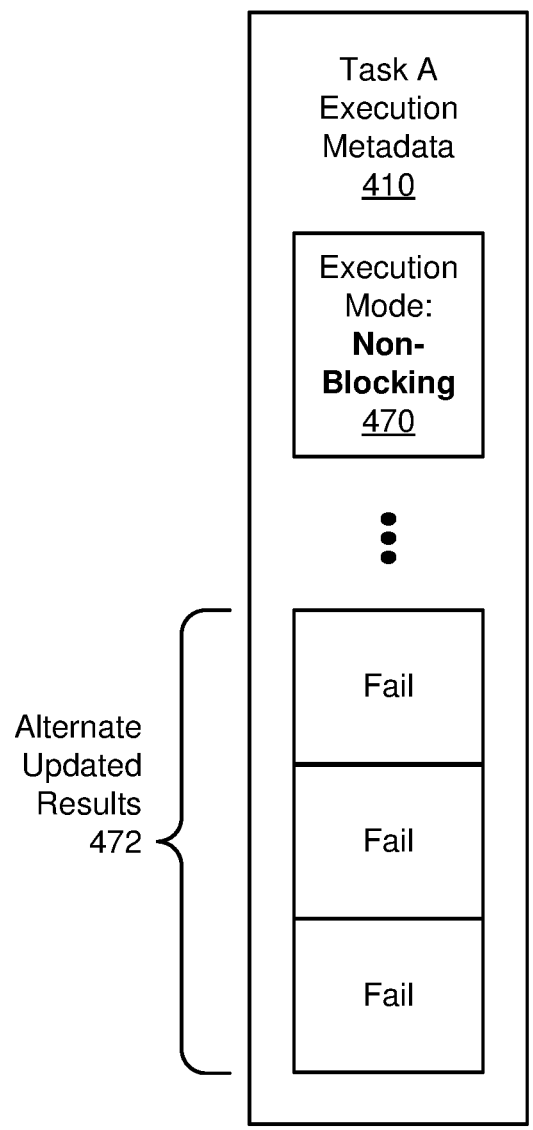

FIG. 4C illustrates an alternate scenario where task A (404A) is included in a deployment pipeline (440). FIG. 4C shows that task A execution metadata (410) includes alternate previous results (450) indicating 2 recent failures. The 2 recent failures correspond to executing task A (404A) in a pipeline other than the deployment pipeline (440). The pipeline execution service executes the tasks of the deployment pipeline (440), including task A (404A), and obtains alternate new results (452) indicating that task A (404A) has again failed. The execution rules for the deployment pipeline (440) include a non-blocking rule that assigns an execution mode of "non-blocking" when the results indicate "fail" 3 times in a row. The combination of the alternate previous results (450) and the alternate new results (452) satisfies the non-blocking rule (454). FIG. 4D shows that the alternate previous results and the alternate new results have been combined into alternate updated results (472). FIG. 4D also shows the modified execution mode of "non-blocking" (470) due to the satisfaction of the non-blocking rule. Thus, since task A (404A) now has an execution mode of "non-blocking" (470), the failure of task A (404A) in the deployment pipeline (440) does not block the deployment pipeline (440). However, in this example, the execution rules for the deployment pipeline (440) indicate that task Z ((404Z) in FIG. 4C) depends on task A (404A). Based on the dependency of task Z (404Z) on the failed task A (404A), the pipeline execution service cancels the execution of task Z (404Z) in the deployment pipeline (440).

Figure 5A:
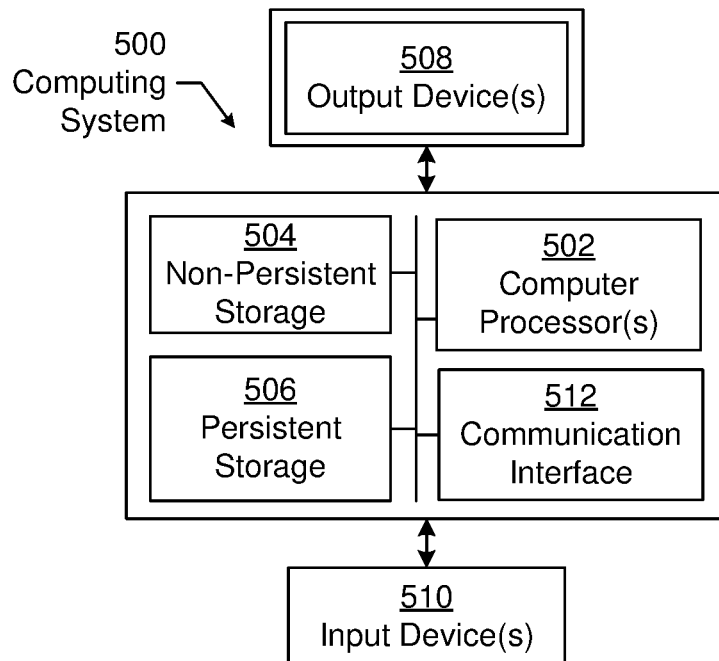
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
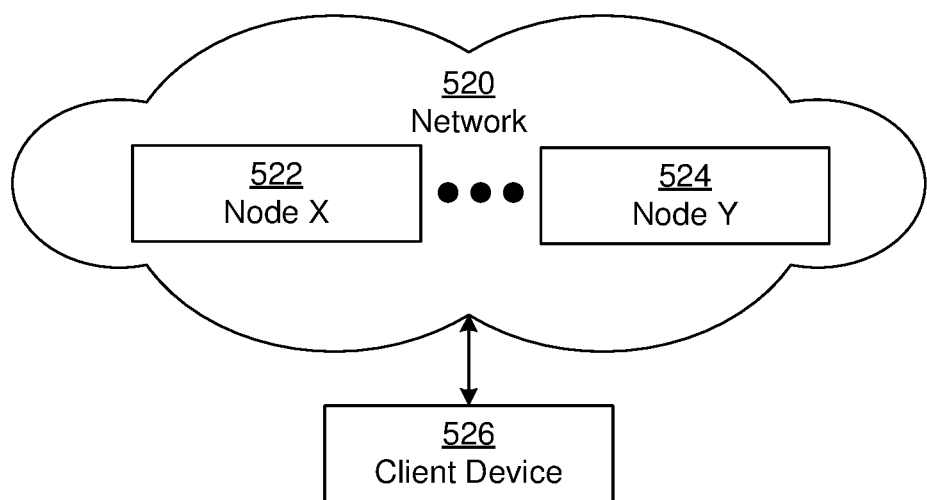

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
  obtaining, for a first task of a first pipeline of an application:
    (i) a first task execution metadata comprising first previous results, and
    (ii) a first task image comprising first executable code and a first execution environment,
  executing the first executable code in the first execution environment to generate first new results; and
  controlling execution of the first pipeline using the first new results and the first previous results.

2. The method of claim 1, further comprising:
  obtaining, for a second task of the first pipeline, a second task image comprising task registration metadata, second executable code, and a second execution environment, the task registration metadata comprising an owner of the second task;
  validating that the task registration metadata satisfies a registration requirement of a contract; and
  in response to validating the task registration metadata, generating second new results by executing the second executable code in the second execution environment.

3. The method of claim 2, further comprising:
  failing to validate that the second new results satisfy output requirements of the contract; and
  in response to failing to validate the second new results:
    removing the second task from the first pipeline; and
    notifying the owner of the second task of the failure to validate the second new results.

4. The method of claim 1, wherein the first pipeline further comprises a second task, the method further comprising:
  obtaining, for the second task, a second task execution metadata comprising second previous results,
  wherein controlling the execution of the first pipeline further comprises prioritizing execution of the first task and the second task using the first task execution metadata and the second task execution metadata.

5. The method of claim 1, further comprising:
  executing the first task in a second pipeline of the application to generate second new results by executing the first executable code in the first execution environment.

6. The method of claim 1, wherein the first task execution metadata further comprises an execution mode, the method further comprising:
  updating the first task execution metadata by adding the first new results to the first previous results; and
  determining, using the updated first task execution metadata, whether to modify the execution mode.

7. The method of claim 1, wherein the first task execution metadata further comprises an execution mode of "non-blocking", the method further comprising:
  obtaining, for a second task of the first pipeline, a second task image comprising second executable code and a second execution environment;
  determining, using the first new results, that execution of the first task was unsuccessful; and
  in response to determining that execution of the first task was unsuccessful, executing the second executable code in the second execution environment.

8. The method of claim 1, wherein the first task execution metadata further comprises an execution mode of "blocking", the method further comprising:
  determining, using the first new results, that execution of the first task was unsuccessful; and
  in response to determining that execution of the first task was unsuccessful, halting execution of the first pipeline.

9. A system, comprising:
  a computer processor;
  a pipeline registry configured to store a first pipeline of an application, the first pipeline comprising a first task;
  a task image registry configured to store, for the first task, a first task image comprising first executable code and a first execution environment;
  an execution metadata repository configured to store, for the first task, a first task execution metadata comprising first previous results; and
  a pipeline execution service executing on the computer processor and configured to:
    execute the first executable code in the first execution environment to generate first new results; and
    control execution of the first pipeline using the first new results and the first previous results.

10. The system of claim 9, wherein the pipeline execution service is further configured to:
  obtain, for a second task of the first pipeline, a second task image comprising task registration metadata, second executable code, and a second execution environment, the task registration metadata comprising an owner of the second task;
  validate that the task registration metadata satisfies a registration requirement of a contract; and
  in response to validating the task registration metadata, generate second new results by executing the second executable code in the second execution environment.

11. The system of claim 10, wherein the pipeline execution service is further configured to:
  fail to validate that the second new results satisfy output requirements of the contract; and
  in response to failing to validate the second new results:
    remove the second task from the first pipeline; and
    notify the owner of the second task of the failure to validate the second new results.

12. The system of claim 9, wherein the first pipeline further comprises a second task, and wherein the pipeline execution service is further configured to:
  obtain, for the second task, a second task execution metadata comprising second previous results,
  wherein controlling the execution of the first pipeline comprises prioritizing execution of the first task and the second task using the first task execution metadata and the second task execution metadata.

13. The system of claim 9, wherein the first task execution metadata further comprises an execution mode, and wherein the pipeline execution service is further configured to:
  update the first task execution metadata by adding the first new results to the first previous results; and
  determine, using the updated first task execution metadata, whether to modify the execution mode.

14. The system of claim 9, wherein the first task execution metadata further comprises an execution mode of "non-blocking", and wherein the pipeline execution service is further configured to:
- obtain, for a second task of the first pipeline, a second task image comprising second executable code and a second execution environment;
- determine, using the first new results, that execution of the first task was unsuccessful; and
- in response to determining that execution of the first task was unsuccessful, execute the second executable code in the second execution environment.

15. The system of claim 9, wherein the first task execution metadata further comprises an execution mode of "blocking", and wherein the pipeline execution service is further configured to:
- determine, using the first new results, that execution of the first task was unsuccessful; and
- in response to determining that execution of the first task was unsuccessful, halt execution of the first pipeline.

16. A non-transitory computer readable medium, not being a signal per se, comprising instructions that, when executed by a computer processor, perform:
- obtaining, for a first task of a first pipeline of an application:
  - (i) a first task execution metadata comprising first previous results, and
  - (ii) a first task image comprising first executable code and a first execution environment,
- executing the first executable code in the first execution environment to generate first new results; and
- controlling execution of the first pipeline using the first new results and the first previous results.

17. The non-transitory computer readable medium of claim 16, further comprising instructions that perform:
- obtaining, for a second task of the first pipeline, a second task image comprising task registration metadata, second executable code, and a second execution environment, the task registration metadata comprising an owner of the second task;
- validating that the task registration metadata satisfies a registration requirement of a contract; and
- in response to validating the task registration metadata, generating second new results by executing the second executable code in the second execution environment.

18. The non-transitory computer readable medium of claim 17, further comprising instructions that perform:
- failing to validate that the second new results satisfy output requirements of the contract; and
- in response to failing to validate the second new results:
  - removing the second task from the first pipeline; and
  - notifying the owner of the second task of the failure to validate the second new results.

19. The non-transitory computer readable medium of claim 16, wherein the first pipeline further comprises a second task, and wherein the instructions further perform:
- obtaining, for the second task, a second task execution metadata comprising second previous results,
- wherein controlling the execution of the first pipeline comprises prioritizing execution of the first task and the second task using the first task execution metadata and the second task execution metadata.

20. The non-transitory computer readable medium of claim 16, wherein the first task execution metadata further comprises an execution mode, and wherein the instructions further perform:
- obtaining, for a second task of the first pipeline, a second task image comprising second executable code and a second execution environment;
- determining, using the first new results, that execution of the first task was unsuccessful; and
- in response to determining that execution of the first task was unsuccessful, executing the second executable code in the second execution environment.

* * * * *